United States Patent
Jeon et al.

(10) Patent No.: US 11,284,465 B2
(45) Date of Patent: Mar. 22, 2022

(54) ELECTRONIC DEVICE AND METHOD FOR CONTROLLING THE SAME

(71) Applicant: LG ELECTRONICS INC., Seoul (KR)

(72) Inventors: Eunyub Jeon, Seoul (KR); Hyuntae Kim, Seoul (KR); Uncheol Lee, Seoul (KR); Donghyun Cho, Seoul (KR); Jina Choi, Seoul (KR); Bermseok Noh, Seoul (KR); Inkyung Kim, Seoul (KR); Jinhoon Kim, Seoul (KR); Sunghwan Ong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/869,286

(22) Filed: May 7, 2020

(65) Prior Publication Data

US 2021/0112618 A1 Apr. 15, 2021

(30) Foreign Application Priority Data

Oct. 11, 2019 (KR) .................... 10-2019-0126406

(51) Int. Cl.
*H04W 4/00* (2018.01)
*H04W 76/19* (2018.01)
(Continued)

(52) U.S. Cl.
CPC ........... *H04W 76/19* (2018.02); *H04W 24/04* (2013.01); *H04W 76/18* (2018.02); *H04W 88/06* (2013.01); *H04W 88/08* (2013.01)

(58) Field of Classification Search
CPC ..... H04W 76/18; H04W 76/19; H04W 76/20; H04W 76/22; H04W 76/23; H04W 76/25;
(Continued)

(56) References Cited

U.S. PATENT DOCUMENTS

2020/0029269 A1* 1/2020 Jia .................... H04W 76/18
2020/0236631 A1* 7/2020 Karimli ............. H04W 52/244

FOREIGN PATENT DOCUMENTS

| KR | 10-2017-0022955 A | 3/2017 |
| KR | 10-2017-0034020 A | 3/2017 |
| KR | 10-2019-0090322 A | 8/2019 |

OTHER PUBLICATIONS

"Sprint's First 5G Devices Available May 31; Pre-Order Begins May 17 for LG V50 ThinQ 5G and HTC 5G Hub". May 31, 2019. Total 4 pages. URL: 'https://newsroom.sprint.com/sprints-first-5g-devices-available-may-31-pre-order-begins-may-17-for-lg-v50-thinq-5g-and-htc-5g-hub.htm'.

* cited by examiner

*Primary Examiner* — Huy C Ho
(74) *Attorney, Agent, or Firm* — Birch, Stewart, Kolasch & Birch, LLP

(57) ABSTRACT

The present disclosure relates to an electronic device capable of performing both fourth-generation (4G) and fifth-generation (5G) communications, which includes a communication unit configured to perform wireless communication with a base station according to at least one of a first communication method and a second communication method, and a modem configured to determine whether an establishment of a communication link according to the first communication method is allowed when a first communication link command according to the first communication method is to received from the base station, and to establish the communication link according to the first communication method based on a result of the determination or re-attempt to establish the communication link according to the first communication method through a recovery process, and wherein the modem interrupts the recovery process to prevent repeated exchange of unnecessary messages with (Continued)

the base station when the establishment of the communication link according to the first communication method is failed even though the establishment of the communication link according to the first communication method is attempted a preset number of times.

13 Claims, 7 Drawing Sheets

(51) Int. Cl.
    *H04W 76/18*     (2018.01)
    *H04W 24/04*     (2009.01)
    *H04W 88/06*     (2009.01)
    *H04W 88/08*     (2009.01)

(58) Field of Classification Search
    CPC ..... H04W 24/04; H04W 88/08; H04W 76/15; H04W 76/10; H04W 36/02; H04W 36/023; H04W 36/03; H04W 36/04; H04W 36/06; H04W 36/08; H04W 36/10; H04W 36/28; H04W 36/30; H04W 52/44
    USPC ......................................................... 370/328
    See application file for complete search history.

(a)

(b)

ELECTRONIC DEVICE AND METHOD FOR CONTROLLING THE SAME

CROSS-REFERENCE TO RELATED APPLICATION

Pursuant to 35 U.S.C. § 119(a), this application claims the benefit of the earlier filing date and the right of priority to Korean Patent Application No. 10-2019-0126406, filed on Oct. 11, 2019, the contents of which is incorporated by reference herein in its entirety.

BACKGROUND

1. Technical Field

The present disclosure relates to an electronic device capable of supporting both 4G communication and 5G communication.

2. Description of the Related Art

Recently, various electronic devices including mobile terminals can use services through a 4G network and a 5G network using a New Radio (NR, 5G) communication technology as well as a Long-Term Evolution (LTE, 4G) communication technology.

Electronic devices that can simultaneously support 4G communication and 5G communication primarily access the 4G network. Under the control of a 4G base station linked to the electronic device, the electronic device measures a signal level of a neighboring 5G base station and reports a search result of the 5G base station based on the measured result to the linked base station (4G base station). The linked base station (4G base station) then sends a 5G link (or connection) command to the electronic device to add the searched 5G base station. The electronic device performs wireless communication with the added 5G base station according to the received 5G connection command. Accordingly, the electronic device can simultaneously access a 4G network and a 5G network.

In this case, a high-speed wireless communication service may be performed according to an NR communication technology, and stable wireless communication can be performed according to an LTE communication technology. A function to simultaneously connect to (or access) 4G and 5G networks is called a dual connectivity (DC) function.

Meanwhile, the electronic device supporting the DC function may perform wireless communication by accessing the 5G network at a place where the 5G network can be supported (or accessed) and by accessing a base station through the 4G network at a place where the 5G network is not supported.

However, 5G communication has an advantage in that a data transmission rate is high, but there is a problem that a temperature of a communication module performing the 5G communication rises rapidly. Moreover, 5G communication using frequencies with very short wavelengths such as millimeter waves (mmWaves) has a problem in that the temperature of the 5G communication module increases more rapidly depending on situations. The 5G communication supports high-speed data transmission, but power consumed in proportion to the data transmission is also high. Even in a place where the 5G network is accessible or connectable, the 5G communication link may be restricted according to the state of the 5G communication module (operation state or temperature) and remaining power.

As such, in case where 5G communication link (or link) is attempted although the 5G communication is restricted, the 5G communication may not be accessed even when a 5G link message is received from a base station in response to the 5G communication link attempt. In this case, the electronic device may determine that the 5G communication link has failed (radio failure). When the 5G communication link fails, the electronic device attempts to access the 5G communication again through a recovery process, and in response, the base station transmits a 5G connection command again.

Accordingly, when 5G communication is restricted in the electronic device, the 5G communication link or link may be repeatedly attempted by the electronic device, which causes the exchange of messages for the 5G communication link or link between the electronic device and the base station plural times, and the repeated reception of the 5G connection command from the base station plural times.

Therefore, when the 5G communication link is restricted in the electronic device, the meaningless message exchange is repeatedly performed between the electronic device and the base station, which causes a waste of radio resources and an unstable communication link state of the electronic device.

SUMMARY

The present disclosure aims to solve the aforementioned problems and other problems, and one aspect of the present disclosure is to provide an electronic device, capable of preventing unnecessary message exchange with a base station for 5G communication link when the 5G communication link is restricted in the electronic device, and a method for controlling the electronic device and the base station.

Another aspect of the present disclosure is to provide an electronic device, capable of sharing its state with base stations during a handover of the electronic device when 5G communication link of the electronic device is restricted, and a method for controlling the electronic device and the base station.

According to an aspect of the present disclosure to achieve the above or another object, there is provided an electronic device according to an implementation of the present disclosure, which may include a communication unit configured to perform wireless communication with a base station according to at least one of a first communication method and a second communication method, and a modem configured to determine whether or not an establishment of a communication link according to the first communication method is allowed when a first communication link command according to the first communication method is received from the base station, and to establish the communication link according to the first communication method based on a result of the determination or re-attempt to establish the communication link according to the first communication method through a recovery process. The modem may interrupt the recovery process to prevent repeated exchange of unnecessary messages with the base station when the establishment of the communication link according to the first communication method is failed even though the establishment of the communication link according to the first communication method is attempted a preset number of times.

In one implementation, the modem may activate a preset status flag and increase a counter value indicating a number of failure to establish the communication link according to the first communication method, when the establishment of the communication link according to the first communication method is not allowed according to the result of the determination as to whether or not the establishment of the communication link according to the first communication method is allowed, while interrupting the recovery process until before a new communication session condition is satisfied when the increased counter value has reached a preset threshold value.

In one implementation, the modem may transmit a message indicating that the establishment of the communication link according to the first communication method is not allowed to the base station when the recovery process is interrupted.

In one implementation, the modem may ignore the communication link command upon receiving the communication link command before a new communication session condition is satisfied when the recovery process is interrupted.

In one implementation, the modem may retransmit a request for establishing the communication link according to the first communication method to the base station through the recovery process and re-receive the communication link command from the base station, in response to the re-transmitted request, when the increased counter value has not reached the preset threshold value.

In one implementation, the modem may determine the modem determines that the new communication session condition has been satisfied when a new data communication is requested or the electronic device is handed over, and re-transmit a request for establishing the communication link according to the first communication method to the base station.

In one implementation, the communication unit may include a first communication module configured to establish a wireless communication link according to the first communication method, and a second communication module configured to establish a wireless communication link according to the second communication method. The modem may determine that the electronic device is in a non-allowed state to establish the communication link according to the first communication method when a temperature of the first communication module is a preset temperature or higher or a battery level of the electronic device is a preset level or lower.

In one implementation, the first communication method may be a Fifth-Generation (5G) communication method using a Sub-6 frequency band and the second communication method may be a Fourth-Generation (4G) communication method.

In one implementation, the modem may transmit a preset communication link failure message to at least one base station employing the first communication method among neighboring base stations of the electronic device, when the establishment of the communication link according to the first communication method is not allowed according to the result of the determination as to whether or not the establishment of the communication link according to the first communication method is allowed.

In one implementation, the modem may perform wireless communication with the base station according to the second communication method when the recovery process is interrupted.

According to an aspect of the present disclosure to achieve the above or another object, there is provided a method for controlling an electronic device and a base station, the including a first step of transmitting, by the electronic device, a request for establishing a communication link according to a first communication method to the base station according to whether a preset communication session condition has been satisfied, a second step of inquiring, by the base station, of the electronic device whether the electronic device is allowed to establish the communication link according to the first communication method, in response to the request for establishing the communication link according to the first communication method, a third step of transmitting, by the electronic device, a response to whether the establishment of the communication link according to the first communication method is allowed, in response to the inquiry, a fourth step of transmitting, by the base station, a communication link command according to the first communication method to the electronic device, based on the response to whether the establishment of the communication link according to the first communication method is allowed, a fifth step of determining, by the electronic device, whether the electronic device is in an allowed state to establish the communication link according to the first communication method, a sixth step of accessing, by the electronic device, the communication according to the first communication method, or activating a status flag and increasing a counter value indicating a number of failure to access the communication according to the first communication method, a seventh step of determining, by the electronic device, whether the increased counter value has reached a preset threshold value when the status flag is activated and the counter value is increased, an eighth step of repeating the first to seventh steps through a recovery process when the increased counter value has not reached the threshold value, and a ninth step of interrupting, by the electronic device, the recovery process and performing wireless communication with the base station according to the second communication method, when the increased counter value has reached the preset threshold value.

In one implementation, the ninth step may include a 9-1$^{th}$ step of transmitting a preset communication disapproval message to the base station.

In one implementation, the third step may include a 3-1$^{th}$ step of transmitting, by the base station, a communication link establishment message according to the first communication method to the electronic device, and a 3-2$^{th}$ step of transmitting, by the electronic device, a response message to the transmitted communication link establishment message to the base station.

In one implementation, the electronic device may ignore the communication link command upon receiving the communication link command before a new communication session condition is satisfied when the increased counter value has reached the threshold value.

In one implementation, the communication session condition may be satisfied when a new data communication is requested or the electronic device is handed over.

In one implementation, the fifth step may include a 5-1$^{th}$ step of transmitting, by the electronic device, a preset communication link failure message to at least one second base station employing the first communication method, among neighboring base stations of the electronic device, when the electronic device is not allowed to establish the communication link according to the first communication met.

In one implementation, the fifth step may further include a 5-2$^{th}$ step of transmitting, by the electronic device, a preset communication link failure message to a first base station linked to the electronic device, when the electronic device is not allowed to establish the communication link according to the first communication method, and a 5-3$^{th}$ step of transmitting, by the first base station having received the preset communication link failure message, the preset communication link failure message to at least one second base station employing the first communication method.

DETAILED DESCRIPTION OF THE EMBODIMENTS

Figure 1A:
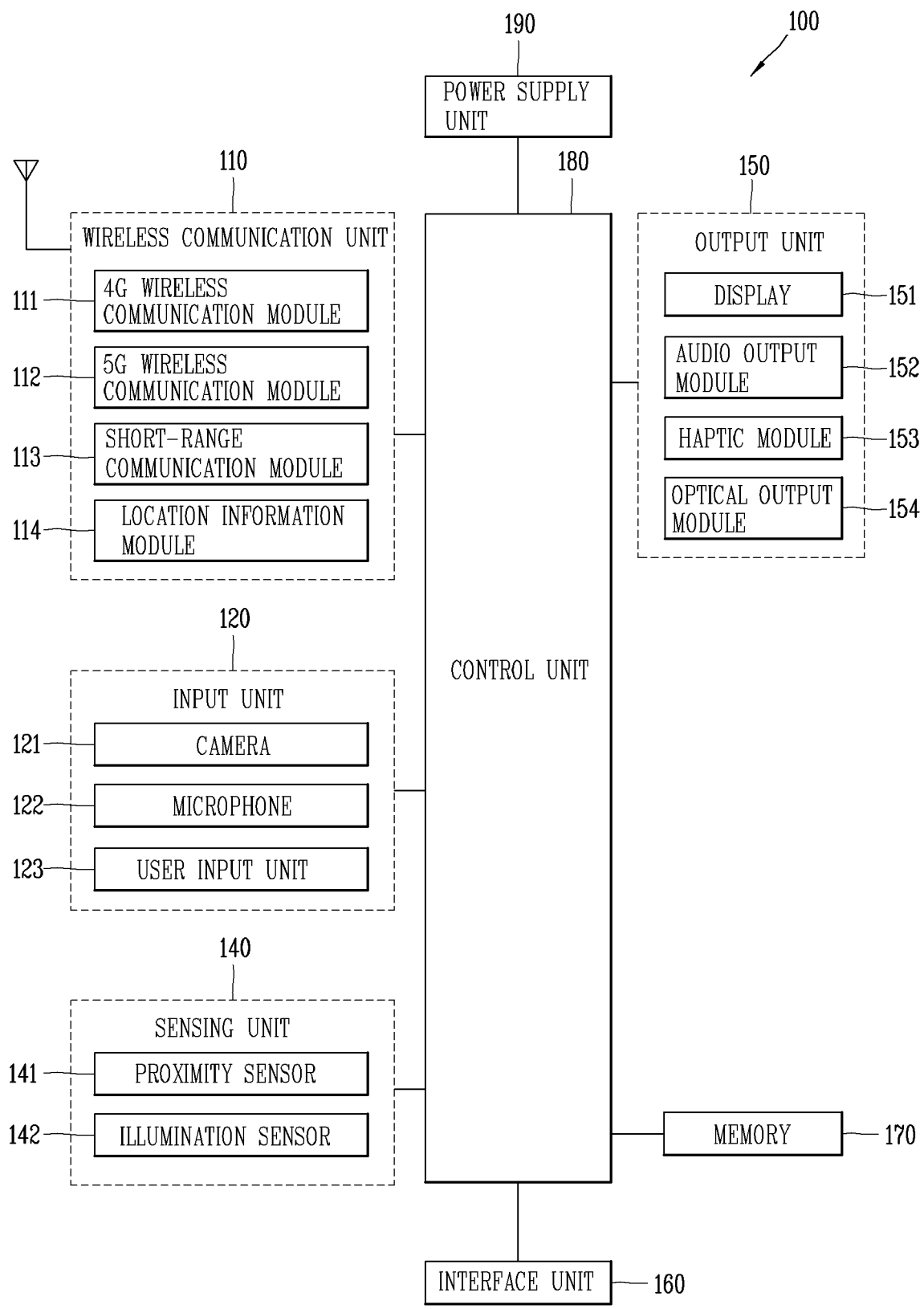
FIG. 1A is a block diagram of an electronic device in accordance with the present disclosure.

Description will now be given in detail according to exemplary embodiments disclosed herein, with reference to the accompanying drawings. For the sake of brief description with reference to the drawings, the same or equivalent components may be provided with the same or similar reference to numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Electronic devices presented herein may be implemented using a variety of different types of terminals. Examples of such devices include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of electronic devices. However, such teachings apply equally to other types of terminals, such as those types noted above. In addition, these teachings may also be applied to stationary terminals such as digital TV, desktop computers, and the like.

Figure 1B:
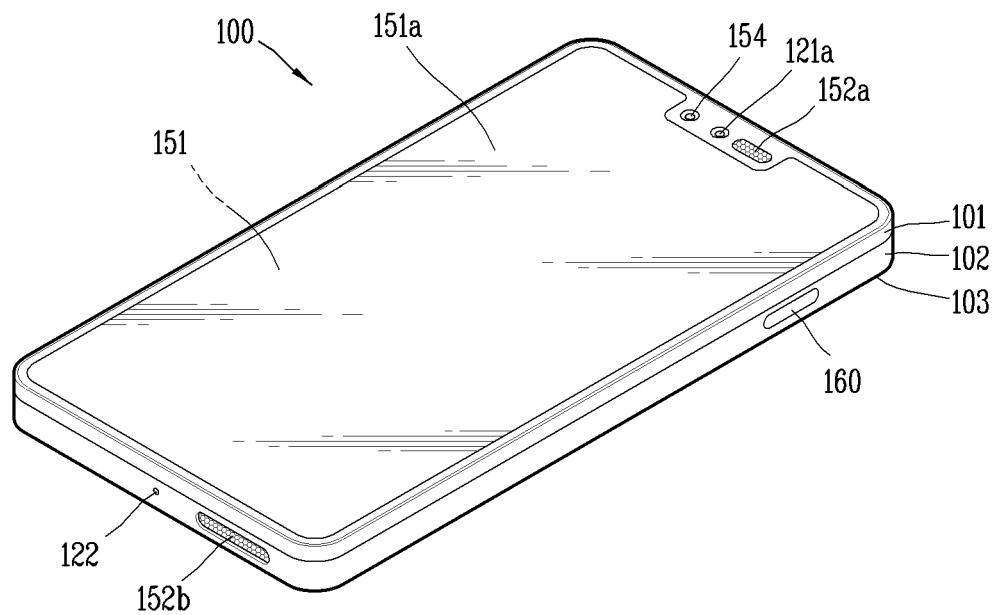
FIGS. 1B and 1C are exemplary views illustrating one example of an electronic device according to the present disclosure, viewed from different directions.
Figure 1C:
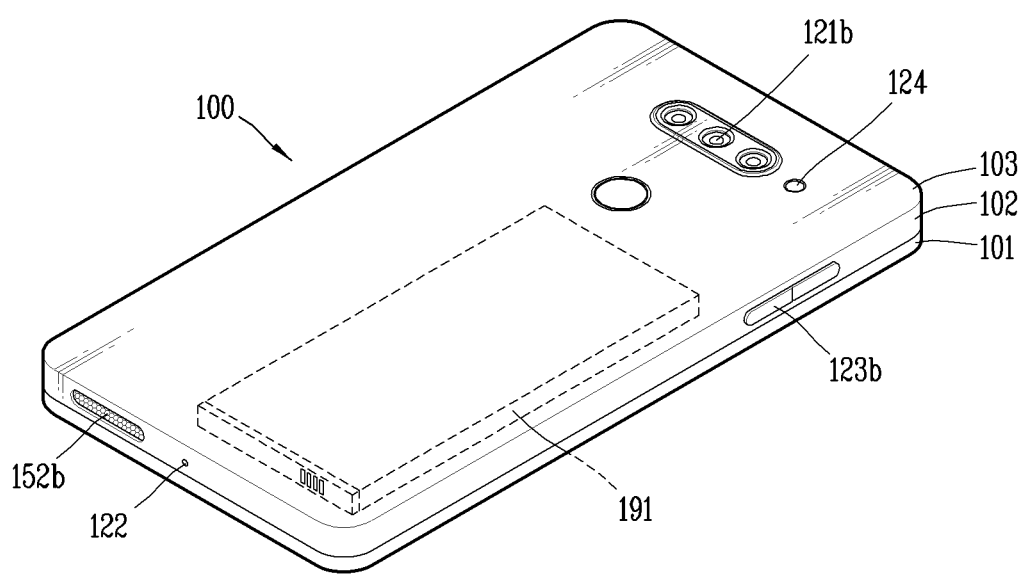

Referring to FIGS. 1A to 1C, FIG. 1A is a block diagram of an electronic device in accordance with one embodiment of the present disclosure, and FIGS. 1B and 1C are conceptual views illustrating one example of an electronic device, viewed from different directions.

The electronic device 100 may be shown having components such as a wireless communication unit 110, an input unit 120, a sensing unit 140, an output unit 150, an interface unit 160, a memory 170, a controller (or control unit) 180, and a power supply unit 190. It is understood that implementing all of the illustrated components in FIG. 1A is not a requirement, and that greater or fewer components may alternatively be implemented.

In more detail, among others, the wireless communication unit 110 may typically include one or more modules which permit communications such as wireless communications between the electronic device 100 and a wireless communication system, communications between the electronic device 100 and another electronic device, or communications between the electronic device 100 and an external server. Further, the wireless communication unit 110 may typically include one or more modules which connect the electronic device 100 to one or more networks. Here, the one or more networks may be a 4G communication network and a 5G communication network, for example.

The wireless communication unit 110 may include at least one of a 4G wireless communication module 111, a 5G wireless communication module 112, a short-range communication module 113, and a location information module 114.

The 4G wireless communication module 111 may perform transmission and reception of 4G signals with a 4G base station through a 4G mobile communication network. In this case, the 4G wireless communication module 111 may transmit at least one 4G transmission signal to the 4G base station. In addition, the 4G wireless communication module 111 may receive at least one 4G reception signal from the 4G base station.

In this regard, Uplink (UL) multi-input multi-output (MIMO) may be performed by a plurality of 4G transmission signals transmitted to the 4G base station. In addition, Downlink (DL) MIMO may be performed by a plurality of 4G reception signals received from the 4G base station.

The 5G wireless communication module 112 may perform transmission and reception of 5G signals with a 5G base station through a 5G mobile communication network. Here, the 4G base station and the 5G base station may have a Non-Stand-Alone (NSA) structure. For example, the 4G base station and the 5G base station may be a co-located structure in which the stations are disposed at the same location in a cell. Alternatively, the 5G base station may be disposed in a Stand-Alone (SA) structure at a separate location from the 4G base station.

The 5G wireless communication module 112 may perform transmission and reception of 5G signals with a 5G base station through a 5G mobile communication network. In this case, the 5G wireless communication module 112 may transmit at least one 5G transmission signal to the 5G base station. In addition, the 5G wireless communication module 112 may receive at least one 5G reception signal from the 5G base station.

In this instance, 5G and 4G networks may use the same frequency band, and this may be referred to as LTE re-farming. Meanwhile, a Sub-6 frequency band, which is a range of 6 GHz or less, may be used as the 5G frequency band.

On the other hand, a millimeter wave (mmWave) range may be used as the 5G frequency band to perform broadband high-speed communication. When the mmWave band is used, the electronic device 100 may perform beam forming for communication coverage expansion with a base station.

On the other hand, regardless of the 5G frequency band, 5G communication systems can support a larger number of multi-input multi-output (MIMO) to improve a transmission rate. In this instance, UL MIMO may be performed by a plurality of 5G transmission signals transmitted to a 5G base station. In addition, DL MIMO may be performed by a plurality of 5G reception signals received from the 5G base station.

On the other hand, the wireless communication unit 110 may be in a Dual Connectivity (DC) state with the 4G base station and the 5G base station through the 4G wireless communication module 111 and the 5G wireless communication module 112. As such, the dual connectivity with the 4G base station and the 5G base station may be referred to as EUTRAN NR DC (ENDC). Here, EUTRAN is an abbreviated form of "Evolved Universal Telecommunication Radio Access Network", and refers to a 4G wireless communication system. Also, NR is an abbreviated form of "New Radio" and refers to a 5G wireless communication system.

On the other hand, if the 4G base station and 5G base station are disposed in a co-located structure, throughput improvement is achieved by inter-Carrier Aggregation (inter-CA). Accordingly, when the 4G base station and the 5G base station are disposed in the EN-DC state, the 4G reception signal and the 5G reception signal may be simultaneously received through the 4G wireless communication module 111 and the 5G wireless communication module 112.

The short-range communication module 113 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the electronic device 100 and a wireless communication system, communications between the electronic device 100 and another electronic device, or communications between the electronic device and a network where another electronic device (or an external server) is located, via wireless area networks. One example of the wireless area networks is a wireless personal area network.

Meanwhile, short-range communication between electronic devices may be performed using the 4G wireless communication module 111 and the 5G wireless communication module 112. In one embodiment, short-range communication may be performed between electronic devices in a device-to-device (D2D) manner without passing through base stations.

Meanwhile, for transmission rate improvement and communication system convergence, Carrier Aggregation (CA) may be carried out using at least one of the 4G wireless communication module 111 and the 5G wireless communication module 112 and the WiFi communication module 113. In this regard, 4G+WiFi CA may be performed using the 4G wireless communication module 111 and the Wi-Fi communication module 113. Or, 5G+WiFi CA may be performed using the 5G wireless communication module 112 and the WiFi communication module 113.

The location information module 114 is a module for acquiring a position (or a current position) of the electronic device 100. As an example, the location information module 115 includes a Global Position System (GPS) module or a WiFi module. For example, when the electronic device uses the GPS module, the position of the electronic device may be acquired using a signal sent from a GPS satellite. As another example, when the electronic device uses the WiFi module, the position of the electronic device may be acquired based on information related to a wireless access point (AP) which transmits or receives a wireless signal to or from the WiFi module. If desired, the location information module 115 may alternatively or additionally function with any of the other modules of the wireless communication unit 110 to obtain data related to the position of the electronic device. The location information module 115 is a module used for acquiring the position (or the current position) of the electronic device, and may not be limited to a module for directly calculating or acquiring the position of the electronic device.

Specifically, when the electronic device utilizes the 5G wireless communication module 112, the position of the electronic device may be acquired based on information related to the 5G base station which performs radio signal transmission or reception with the 5G wireless communication module. In particular, since the 5G base station of the mmWave band is deployed in a small cell having a narrow coverage, it is advantageous to acquire the position of the electronic device.

The input unit 120 may include a camera 121 or an image input unit for obtaining images or video, a microphone 122, which is one type of audio input device for inputting an audio signal, and a user input unit 123 (for example, a touch key, a mechanical key, and the like) for allowing a user to input information. Data (for example, audio, video, image, and the like) may be obtained by the input unit 120 and may be analyzed and processed according to user commands.

The sensing unit 140 may typically be implemented using one or more sensors configured to sense internal information of the electronic device, the surrounding environment of the electronic device, user information, and the like. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). The electronic device disclosed herein may be configured to utilize information obtained from one or more sensors of the sensing unit 140, and combinations thereof.

The output unit 150 may typically be configured to output various types of information, such as audio, video, tactile output, and the like. The output unit 150 may be shown having at least one of a display 151, an audio output module 152, a haptic module 153, and an optical output module 154. The display 151 may have an inter-layered structure or an integrated structure with a touch sensor in order to implement a touch screen. The touch screen may function as the user input unit 123 which provides an input interface between the electronic device 100 and the user and simultaneously provide an output interface between the electronic device 100 and a user.

The interface unit 160 serves as an interface with various types of external devices that are coupled to the electronic device 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the electronic device 100 may perform assorted control functions associated with a connected external device, in response to the external device being connected to the interface unit 160.

The memory 170 is typically implemented to store data to support various functions or features of the electronic device 100. For instance, the memory 170 may be configured to store application programs executed in the electronic device 100, data or instructions for operations of the electronic device 100, and the like. Some of these application programs may be downloaded from an external server via wireless communication. Other application programs may be installed within the electronic device 100 at time of manufacturing or shipping, which is typically the case for basic functions of the electronic device 100 (for example, receiving a call, placing a call, receiving a message, sending a message, and the like). Application programs may be stored in the memory 170, installed in the electronic device 100, and executed by the controller 180 to perform an operation (or function) for the electronic device 100.

The controller 180 typically functions to control an overall operation of the electronic device 100, in addition to the operations associated with the application programs. The controller 180 may provide or process information or functions appropriate for a user by processing signals, data, information and the like, which are input or output by the aforementioned various components, or activating application programs stored in the memory 170.

Also, the controller 180 may control at least some of the components illustrated in FIG. 1A, to execute an application program that have been stored in the memory 170. In addition, the controller 180 may control at least two of those components included in the electronic device 100 to activate the application program.

Hereinafter, the controller 180 that controls the overall operation of the electronic device will be referred to as a terminal controller 180.

The power supply unit 190 may be configured to receive external power or provide internal power in order to supply appropriate power required for operating elements and components included in the electronic device 100, under the control of the terminal controller 180. The power supply unit 190 may include a battery, and the battery may be configured as an embedded battery or a detachable battery. Hereinafter, the power supply unit 190 for supplying power to each component included in the electronic device 100 will be referred to as a terminal power supply unit 190.

At least part of the components may cooperatively operate to implement an operation, a control or a control method of an electronic device according to various embodiments disclosed herein. Also, the operation, the control or the control method of the electronic device may be implemented on the electronic device by an activation of at least one application program stored in the memory 170.

Referring to FIGS. 1B and 1C, the disclosed electronic device 100 includes a bar-like terminal body. However, the electronic device 100 may alternatively be implemented in any of a variety of different configurations. Examples of such configurations include watch type, clip-type, glasses-type, or a folder-type, flip-type, slide-type, swing-type, and swivel-type in which two and more bodies are combined with each other in a relatively movable manner, and combinations thereof. Discussion herein will often relate to a particular type of electronic device. However, such teachings with regard to a particular type of electronic device will generally be applied to other types of electronic devices as well.

Here, considering the electronic device 100 as at least one assembly, the terminal body may be understood as a conception referring to the assembly.

The electronic device 100 will generally include a case (for example, frame, housing, cover, and the like) forming the appearance of the terminal. In this embodiment, the case is formed using a front case 101 and a rear case 102. Various electronic components are interposed into a space formed between the front case 101 and the rear case 102. At least one middle case may be additionally positioned between the front case 101 and the rear case 102.

The display unit 151 is shown located on the front side of the terminal body to output information. As illustrated, a window 151a of the display 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. In this case, a rear cover 103 is shown covering the electronic components, and this cover may be detachably coupled to the rear case 102. Therefore, when the rear cover 103 is detached from the rear case 102, the electronic components mounted on the rear case 102 are exposed to the outside. Meanwhile, side surfaces of the rear case 102 may partially be implemented to operate as radiators.

As illustrated, when the rear cover 103 is coupled to the rear case 102, a side surface of the rear case 102 may partially be exposed. In some cases, upon the coupling, the rear case 102 may also be completely shielded by the rear cover 103. Meanwhile, the rear cover 103 may include an opening for externally exposing a camera 121b or an audio output module 152b.

The electronic device 100 may include a display 151, first and second audio output module 152a and 152b, a proximity sensor 141, an illumination sensor 142, an optical output module 154, first and second cameras 121a and 121b, first and second manipulation units 123a and 123b, a microphone 122, an interface unit 160, and the like.

The display 151 is generally configured to output information processed in the electronic device 100. For example, the display 151 may display execution screen information of an application program executing at the electronic device 100 or user interface (UI) and graphic user interface (GUI) information in response to the execution screen information.

The display 151 may be implemented using two display devices, according to the configuration type thereof. For instance, a plurality of the displays 151 may be arranged on one side, either spaced apart from each other, or these devices may be integrated, or these devices may be arranged on different surfaces.

The display 151 may include a touch sensor that senses a touch with respect to the display 151 so as to receive a control command in a touch manner. Accordingly, when a touch is applied to the display 151, the touch sensor may sense the touch, and the terminal controller 180 may generate a control command corresponding to the touch. Contents input in the touch manner may be characters, numbers, instructions in various modes, or a menu item that can be specified.

In this way, the display 151 may form a touch screen together with the touch sensor, and in this case, the touch screen may function as the user input unit (123, see FIG. 1A). In some cases, the touch screen may replace at least some of functions of a first manipulation unit 123a.

The first audio output module 152a may be implemented as a receiver for transmitting a call sound to a user's ear and the second audio output module 152b may be implemented as a loud speaker for outputting various alarm sounds or multimedia playback sounds.

The optical output module 154 may be configured to output light for indicating an event generation. Examples of such events may include a message reception, a call signal reception, a missed call, an alarm, a schedule alarm, an email reception, information reception through an application, and the like. When a user has checked a generated event, the terminal controller 180 may control the optical output module 154 to stop the light output.

The first camera 121a may process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the electronic device 100. The first and second manipulation units 123a and 123b may also be commonly referred to as a manipulating portion. The first and second manipulation units 123a and 123b may employ any method if it is a tactile manner allowing the user to perform manipulation with a tactile feeling such as touch, push, scroll or the like. The first and second manipulation units 123a and 123b may also be manipulated through a proximity touch, a hovering touch, and the like, without a user's tactile feeling.

On the other hand, the electronic device 100 may include a finger scan sensor which scans a user's fingerprint. The controller may use fingerprint information sensed by the finger scan sensor as an authentication means. The finger scan sensor may be installed in the display 151 or the user input unit 123.

The microphone 122 may be configured to receive the user's voice, other sounds, and the like. The microphone 122 may be provided at a plurality of places, and configured to receive stereo sounds.

The interface unit 160 may serve as a path allowing the electronic device 100 to interface with external devices. For example, the interface unit 160 may be at least one of a connection terminal for connecting to another device (for example, an earphone, an external speaker, or the like), a port for near field communication (for example, an Infrared DaAssociation (IrDA) port, a Bluetooth port, a wireless LAN port, and the like), or a power supply terminal for supplying power to the electronic device 100. The interface unit 160 may be implemented in the form of a socket for accommodating an external card, such as Subscriber Identification Module (SIM), User Identity Module (UIM), or a memory card for information storage.

The second camera 121b may be further mounted to the rear surface of the terminal body. The second camera 121b may have an image capturing direction, which is substantially opposite to the direction of the first camera unit 121a.

The second camera 121b may include a plurality of lenses arranged along at least one line. The plurality of lenses may be arranged in a matrix form. The cameras may be referred to as an 'array camera.' When the second camera 121b is implemented as the array camera, images may be captured in various manners using the plurality of lenses and images with better qualities may be obtained.

The flash 124 may be disposed adjacent to the second camera 121b. When an image of a subject is captured with the camera 121b, the flash 124 may illuminate the subject.

The second audio output module 152b may further be disposed on the terminal body. The second audio output module 152b may implement stereophonic sound functions in conjunction with the first audio output module 152a, and may be also used for implementing a speaker phone mode for call communication.

At least one antenna for wireless communication may be disposed on the terminal body. The antenna may be embedded in the terminal body or formed in the case. Meanwhile, a plurality of antennas connected to the 4G wireless communication module 111 and the 5G wireless communication module 112 may be disposed on side surfaces of the electronic device. Alternatively, an antenna may be formed in a form of film to be attached onto an inner surface of the rear cover 103 or a case including a conductive material may serve as an antenna.

Meanwhile, the plurality of antennas disposed on the side surfaces of the electronic device may be provided in four or more to support MIMO. In addition, when the 5G wireless communication module 112 operates in the mmWave band, each of the plurality of antennas may be implemented as an array antenna, and thus the plurality of array antennas may be disposed in the electronic device.

The terminal body is provided with a terminal power supply unit 190 (see FIG. 1A) for supplying power to the electronic device 100. The terminal power supply unit 190 may include a batter 191 which is mounted in the terminal body or detachably coupled to an outside of the terminal body.

Hereinafter, description will be given of embodiments of a multi-transmission system structure and an electronic device having the same, specifically, a power amplifier in a heterogeneous radio system and an electronic device having the same according to the present disclosure, with reference to the accompanying drawings. It will be apparent to those skilled in the art that the present disclosure may be embodied in other specific forms without departing from the essential characteristics thereof.

Figure 2:
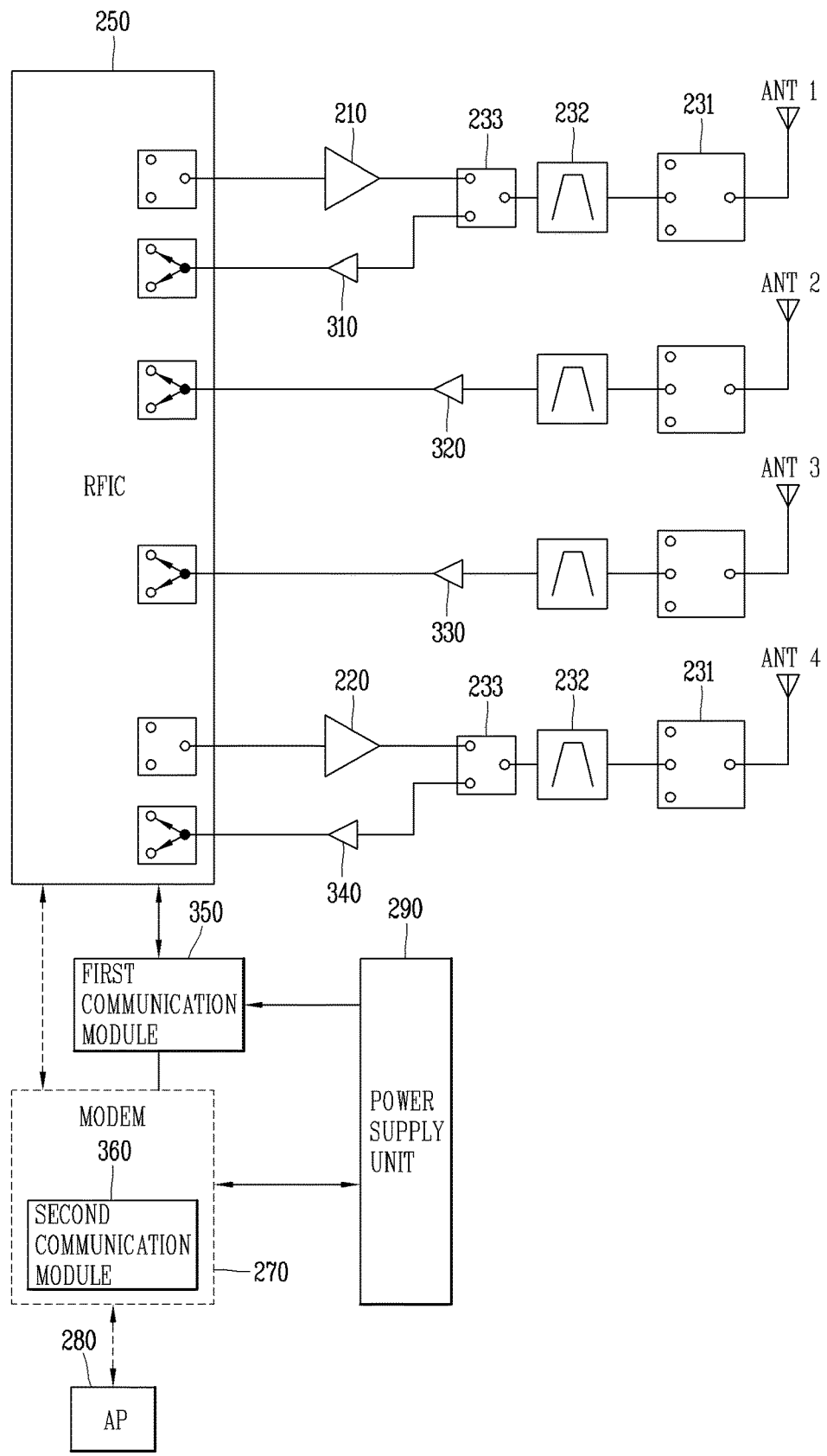
FIG. 2 is a block diagram illustrating a configuration of a wireless communication unit of an electronic device operable in a plurality of wireless communication systems according to an embodiment.

FIG. 2 is a block diagram illustrating a configuration of a wireless communication unit of an electronic device operable in a plurality of wireless communication systems according to an embodiment. Referring to FIG. 2, the electronic device includes a first power amplifier 210, a second power amplifier 220, and an RFIC 250. In addition, the electronic device may further include a modem 270, an application processor (AP) 280, and a power supply unit 290.

On the other hand, the modem 270 may be physically implemented on one chip with at least one of a first communication module (e.g., 5G wireless communication module) 350 and a second communication module (e.g., 4G wireless communication module) 360. When the first communication module 350 and the second communication module 360 are implemented as one modem (integrated modem), the integrated modem may perform all of modulation/demodulation for transmitting and receiving 5G signals, and modulation/demodulation for transmitting and receiving 4G signals.

Alternatively, the modem 270 may be integrated with any one (the first communication module 350) of the first communication module 350 and the second communication module 360. In this case, another wireless communication module (second communication module 360) may be implemented in the form of a chip physically isolated from the modem 270. In this case, the modem basically performs modulation and demodulation according to a wireless communication method using the first communication module 350, and may be connected to the second communication module 360 as necessary. In this case, the second communication module 360 may perform modulation and demodulation according to a wireless communication method different from that of the modem. Accordingly, the second communication module 360 may perform wireless communication with both a 4G base station and a 5G base station, thereby being simultaneously connected to both the 4G wireless network and the 5G wireless network (Dual Connectivity (DC)).

In the following description, for convenience of description, a case where the modem 270 is integrated with a 4G wireless communication module (second communication module 360) will be described as an example. In this case, the first wireless communication module 350 may be implemented in the form of a chip physically isolated from the modem 270. In this case, the modem 270 may basically provide 4G wireless network services through the integrated 4G wireless communication module 360. When the DC function is activated, the modem 270 may be connected to the 5G wireless communication module 350 to simultaneously provide 5G wireless network services through the 5G wireless communication module 350.

The power supply unit 290 may be connected to the modem 270 and the 5G wireless communication module 350. In addition, the power supply unit 290 may supply power required for driving the modem 270 and the 5G wireless communication module 350. The power supply unit 290 may be a battery of the electronic device 100 and may be a Power Management Integrated Circuit (PMIC) for supplying power from the battery to each component.

Here, the modem 270 and the application processor 280 may be implemented physically on one chip and may be logically and functionally isolated from each other. However, the present disclosure is not limited thereto and the modem 270 and the application processor 280 may be physically isolated from each other on one chip according to an application.

Meanwhile, the electronic device 100 includes a plurality of low noise amplifiers (LNAs) 310 to 340 in a receiver. Here, the first power amplifier 210, the second power amplifier 220, the RFIC 250, and the plurality of LNAs 310 to 340 are all operable in the first communication system and the second communication system. For example, the first communication system and the second communication system may be a 5G communication system and a 4G communication system, respectively.

Here, the 5G communication system may be a communication system using frequencies of a mmWave band. Or it may be a communication system using frequencies of a Sub-6 band.

In more detail, when the 5G communication system operates in the Sub-6 band, the first communication system may be a communication system that performs 5G communication using at least one of frequencies of 800 Mhz, 1.9 Ghz, and 2.5 Ghz bands.

As illustrated in FIG. 2, the RFIC 250 may be configured as a 4G/5G integrated type, but the present disclosure is not limited thereto. The RFIC 250 may be configured as a 4G/5G separated type according to an application. When the RFIC 250 is configured as the 4G/5G integrated type, it has advantages in terms of synchronization between 4G and 5G circuits and simplification of control signaling by the modem 270.

On the other hand, when the RFIC 250 is configured as the 4G/5G separated type, the separated RFIDs may be referred to as 4G RFIC and 5G RFIC, respectively. In particular, when there is a great difference between a 5G band and a 4G band, such as a case where the 5G band is configured as a mmWave band, the RFIC 250 may be configured as the 4G/5G separated type. As such, when the RFIC 250 is configured as the 4G/5G separated type, RF characteristics can be optimized for each of a 4G frequency band and a 5G frequency band.

Meanwhile, even when the RFIC 250 is configured as the 4G/5G separated type, the 4G RFIC and the 5G RFIC may be logically and functionally separated from each other and may be implemented physically on one chip.

On the other hand, the application processor 280 is configured to control an operation of each component of the electronic device. In detail, the application processor 280 may control the operation of each component of the electronic device through the modem 270.

For example, the application processor 280 may control the modem 270 through a power management IC (PMIC) for a low power operation of the electronic device. Accordingly, the modem 270 may control power circuits of a transmitter and a receiver to operate in a low power mode through the RFIC 250.

In this regard, when it is determined that the electronic device 100 is in an idle mode, the application processor 280 may control the RFIC 250 through the modem 270 in the following manner. For example, when the electronic device is in an idle mode, the application processor 280 may control the RFIC 250 through the modem 270, such that at least one of the first and second power amplifiers 110 and 120 operates in the low power mode or is turned off.

According to another implementation, the application processor 280 may control the modem 270 to provide wireless communication supporting low power communication when the electronic device is in the low power mode. For example, when the electronic device is linked (or connected) to a plurality of entities among a 4G base station, a 5G base station, and an access point, the application processor 280 may control the modem 270 to enable wireless communication with the lowest power. Accordingly, the application processor 280 may control the modem 270 and the RFIC 250 to perform short-range communication using only the short-range communication module 113, even at the slight expense of throughput.

According to another implementation, when a battery level of the electronic device is higher than or equal to a threshold value, the application processor 280 may control the modem 270 to select an optimal wireless interface. For example, the application processor 280 may control the modem 270 to receive data through both the 4G base station and the 5G base station according to the battery level and available radio resource information. In this case, the application processor 280 may receive battery level information from the PMIC, and the available radio resource information from the modem 270. Accordingly, when the battery level and the available radio resources are sufficient, the application processor 280 may control the modem 270 and the RFIC 250 to receive data through both the 4G base station and the 5G base station.

Meanwhile, a multi-transceiving system of FIG. 2 may integrate a transmitter and a receiver of each radio system into one transceiver. This has an advantage of eliminating a circuitry part where two types of system signals are integrated with each other at an RF front-end.

In addition, since front end components can be controlled by such integrated transceiver, the front end components can be integrated more efficiently than when the transceiving system is separated for each communication system.

In addition, upon the separation for each communication system, the control of other communication systems according to necessity is impossible and thereby system delay extends. This makes it impossible to allocate resources efficiently. On the other hand, the multi-transceiving system as illustrated in FIG. 2 has advantages of controlling different communication systems according to necessity and minimizing system delay, which may result in enabling efficient resource allocation.

Meanwhile, the first power amplifier 210 and the second power amplifier 220 may operate in at least one of the first and second communication systems. In this regard, when a communication system operates in a 4G frequency band or a sub-6 frequency band, the first and second power amplifiers 210 and 220 may operate in both the first and second communication systems.

On the other hand, when a communication system operates in a mmWave band, one of the first and second power amplifiers 210 and 220 may operate in the 4G band and the other in the mmWave band.

Meanwhile, a transceiving antenna may be implemented by integrating a transceiver and a receiver, and thus two different wireless communication systems may be implemented using such single transceiving antenna. In this case, 4×4 MIMO may be implemented using four antennas as illustrated in FIG. 2. At this time, 4×4 DL MIMO may be performed through downlink (DL).

Meanwhile, when the 5G band is the sub-6 band, first to fourth antennas ANT1 to ANT4 may be configured to operate in both the 4G band and the 5G band. On the other hand, when the 5G band is the mmWave band, the first to fourth antennas ANT1 to ANT4 may be configured to operate in any one of the 4G band and the 5G band. In this case, when the 5G band is the mmWave band, a plurality of antennas may be configured as an array antenna in the mmWave band.

Meanwhile, 2×2 MIMO may be implemented using two antennas connected to the first power amplifier 210 and the second power amplifier 220 among the four antennas. At this time, 2×2 UL MIMO (2 Tx) may be performed through uplink (UL). Alternatively, the present disclosure is not limited to 2×2 UL MIMO and may be implemented using 1Tx or 4Tx. In this case, when the 5G communication system is implemented using 1Tx, only one of the first and second power amplifiers 210 and 220 may operate in the 5G communication band. Meanwhile, when the 5G communication system is implemented using 4Tx, an additional power amplifier operating in the 5G band may be further provided. Alternatively, a transmission signal may be branched at one transmission path or each of two transmission paths, and the branched transmission signal may be connected to the plurality of antennas.

On the other hand, a switch-type splitter or power divider is embedded in an RFIC corresponding to the RFIC 250. Accordingly, a separate external component is not needed, thereby improving a component mounting configuration. In more detail, a single pole double throw (SPDT) type switch may be provided in the RFIC corresponding to the controller 250 to select transmitters (TXs) of two different communication systems.

Also, the electronic device operable in the plurality of wireless communication systems according to the present disclosure may further include duplexer 231, filters 232, and switches 233.

The duplexers 231 are configured to isolate signals of a transmission band and a reception band from each other. In this case, signals of a transmission band transmitted through the first and second power amplifiers 210 and 220 may be applied to the antennas ANT1 and ANT4 through first output ports of the duplexers 231. On the other hand, signals of a reception band received through the antennas ANT1 and ANT4 may be received by the low noise amplifiers 310 and 340 through second output ports of the duplexers 231.

The filters 232 may be configured to pass signals of a transmission band or a reception band and block signals of the other bands. In this case, the filter 232 may include a transmission filter connected to the first output port of the duplexer 231 and a reception filter connected to a second output port of the duplexer 231. Alternatively, the filter 232 may be configured to pass only the signals of the transmission band or only the signals of the reception band according to a control signal.

The switches 233 are configured to transmit only one of the transmission signal or the reception signal. In one implementation of the present disclosure, the switch 233 may be configured as a single pole double throw (SPDT) type switch to isolate a transmission signal and a reception signal from each other using a time division duplex (TDD) scheme. In this case, the transmission signal and the reception signal are signals of the same frequency band, and thus the duplexer 231 may be implemented as a type of circulator.

Meanwhile, in another implementation of the present invention, the switch 233 may also be applied to a frequency division multiplex (FDD) scheme. In this case, the switch 233 may be configured as a double pole double throw (DPDT) type switch to connect or block a transmission signal and a reception signal. On the other hand, since the transmission signal and the reception signal can be isolated by the duplexer 231, the switch 233 is not always necessary.

Meanwhile, the electronic device according to the present disclosure may further include the modem 270 corresponding to the controller. In this case, the RFIC 250 and the modem 270 may be referred to as a first controller (or a first processor) and a second controller (a second processor), respectively. Meanwhile, the RFIC 250 and the modem 270 may be implemented as physically isolated circuits. Alternatively, the RFIC 250 and the modem 270 may be logically or functionally distinguished from each other on one physical circuit.

The modem 270 may perform control of signal transmission and reception through different communication systems and processing of those signals by use of the RFID 250. The modem 270 may receive control information from a 4G base station and/or a 5G base station. Here, the control information may be received through a physical downlink control channel (PDCCH), but the present disclosure is not limited thereto.

The modem 270 may control the RFIC 250 to transmit and/or receive signals through the first communication system and/or the second communication system at a specific time and frequency resources. Accordingly, the RFIC 250 may control transmission circuits including the first and second power amplifiers 210 and 220 to transmit 4G signals or 5G signals at a specific time interval. In addition, the RFIC 250 may control reception circuits including the first to fourth low noise amplifiers 310 to 340 to receive 4G signals or 5G signals at a specific time interval.

Figure 3:
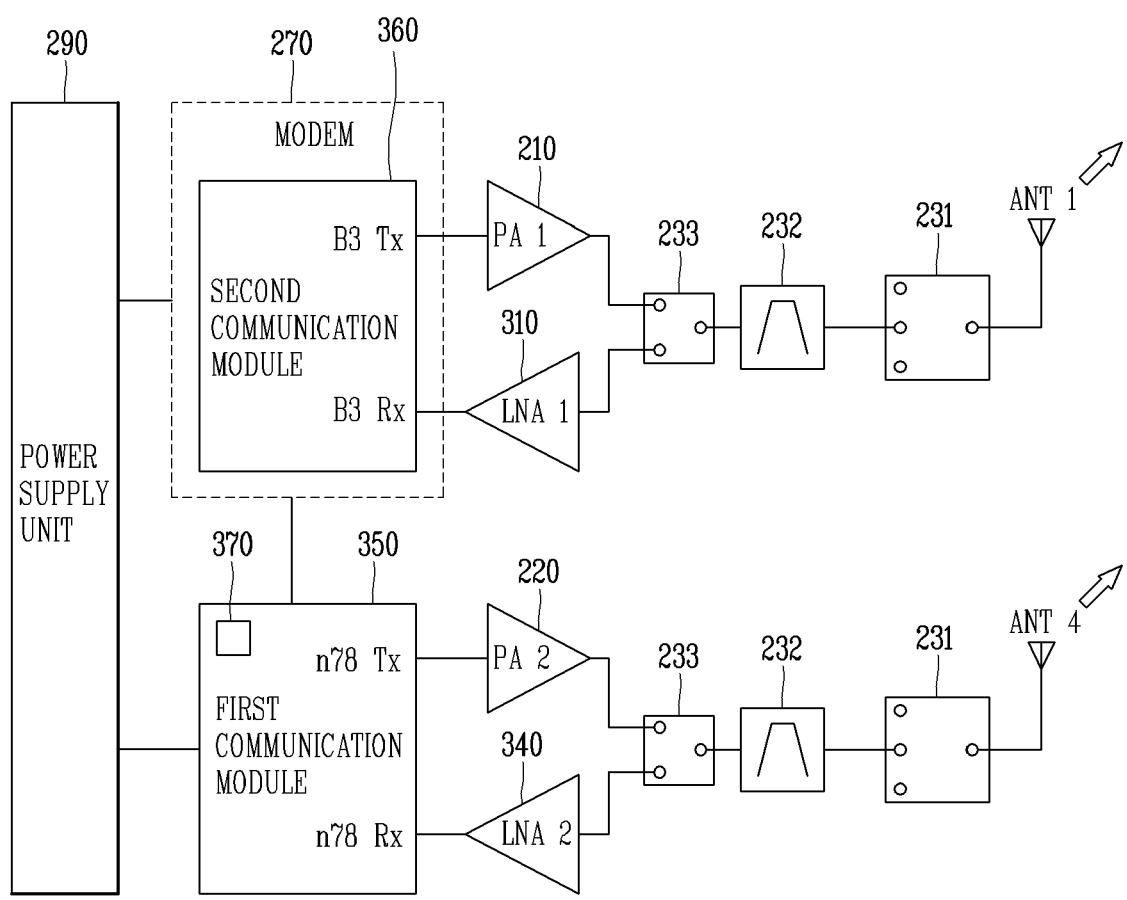
FIG. 3 is a block diagram illustrating in detail each wireless communication module of the wireless communication unit illustrated in FIG. 2.

FIG. 3 is a block diagram illustrating in detail each wireless communication module of the wireless communication unit illustrated in FIG. 2.

The wireless communication unit of the electronic device 100 according to an implementation of the present disclosure may include two or more power amplifiers like 2T4R illustrated in FIG. 2. However, for brief description, description will be given under the assumption that multi-transmission is performed when two power amplifiers are provided as illustrated in FIG. 3. However, the present disclosure is not limited to such a structure, and of course, there may be more power amplifiers or a larger number of communication systems depending on applications.

Referring to FIG. 3, the wireless communication unit of the electronic device 100 includes the first power amplifier 210, the first low noise amplifier 310, the second power amplifier 220, the second low noise amplifier 340, the modem 270, the 5G wireless communication module 350, and the power supply unit 290.

The modem 270 may include the first communication module 350 that can operate in the 5G communication system and the second communication module 360 that operate in the 4G communication system. The first communication module 350 and the modem 270 may be physically isolated or functionally isolated on one physical chip. However, the present disclosure is not limited thereto, and the modem 270 may alternatively be configured in an integral form which includes the first communication module 350 and the second communication module 360.

The first power amplifier 210 and the first low noise amplifier 310 may be operable in the first communication system, and the second power amplifier 220 and the second low noise amplifier 340 may be operable in the second communication system. In this case, the first and second communication systems may be the 5G communication system and the 4G communication system, but the present disclosure is not limited thereto.

Meanwhile, the modem 270 and the first communication module 350 may be electrically connected to each other. The first communication module 350 may perform modulation/demodulation for transmitting or receiving 5G signals under the control of the modem 270. In this case, the modem 270 may control an operation state (e.g., activation or deactivation) of the second communication module 360.

For example, the modem 270 may control the second communication module 360 to receive data through both the 4G base station and the 5G base station according to an operation state detection result of the electronic device 100 detected by the application processor 280. In this case, the modem 270 may activate the first communication module 350, and the activated first communication module 350 may search for a 5G base station (cell) that meets a preset condition from surroundings of the electronic device 100. The first communication module 350 may then add the searched 5G base station (5G Cell ADD) and perform wireless communication so as to provide a service through a 5G network. In this case, the electronic device 100 may operate in a Non-Stand Alone (NSA) manner to be connected or linked to both the 4G and 5G networks (DC).

On the other hand, the modem 270 may deactivate the first communication module 350 according to the operation state detection result of the electronic device 100. In this case, the modem 270 may control the first communication module 350 to operate in a low power mode.

Meanwhile, the first communication module 350 switched to the low power mode may not search for the 5G base station. Then, the addition of the 5G base station (5G cell ADD) and the wireless communication with the searched 5G base station may not be carried out. Accordingly, the electronic device 100 may operate in a state of performing wireless communication only with the 4G base station through the second communication module 360, namely, in a Stand Alone (SA) state in which it is linked or connected only to the 4G network.

The power supply unit 290 may supply power for driving the modem 270 and the first communication module 350. Here, the power supply unit 290 may also control a current supplied to the first communication module 350 under the control of the modem 270. In this case, the modem 270 may deactivate the first communication module 350 by controlling the power supply unit 290 to supply a current smaller than a preset threshold value to the first communication module 350.

For example, the first communication module 350 may operate in a normal operation mode when a current supplied from the power supply unit 290 is greater than or equal to the preset threshold value. Then, the first communication module 350 may search for a 5G base station, add the searched 5G base station (5G Cell ADD), and then perform wireless communication with the 5G base station. Therefore, the electronic device 100 may operate in a Non-Stand Alone (NSA) state in which it is linked or connected to both the 4G and 5G networks.

On the other hand, the first communication module 350 may operate in a normal operation mode when a current supplied from the power supply unit 290 is smaller than the preset threshold value. Then, the first communication module 350 may interrupt the search for the 5G base station (cell). Accordingly, the electronic device 100 may operate in a state of performing wireless communication only with the 4G base station, that is, in the SA state in which it is linked or connected only to the 4G network.

Meanwhile, the first communication module 350 may include a temperature sensor 370. The temperature sensor 370 may detect a temperature of the first communication module 350 and transmit the detected temperature to the modem 270. Accordingly, the modem 270 may detect the temperature of the first communication module 350 based on the temperature value detected by the temperature sensor 370.

Meanwhile, FIG. 3 exemplarily illustrates the configuration that the temperature sensor 370 is provided in the first communication module 350. However, the temperature sensor 370 may alternatively be provided in at least one of the first power amplifier 210 for amplifying a signal to be transmitted according to a first communication method or the first low noise amplifier 310 for amplifying a signal received according to the first communication method. In this case, the temperature of the first communication module 350 may be a temperature detected by the first power amplifier 210 or the first low noise amplifier 310.

Meanwhile, the following description will be given of detailed operations and functions of an electronic device according to the present disclosure, which is provided with the multi-transceiving system as illustrated in FIGS. 2 and 3.

Meanwhile, the electronic device 100 and a base station may exchange information necessary for 5G communication by using a preset message format, and a 5G communication link may be established between them. (a) of FIG. 4 illustrates examples of messages exchanged between the electronic device 100 and a base station for a 5G communication link.

Figure 4:
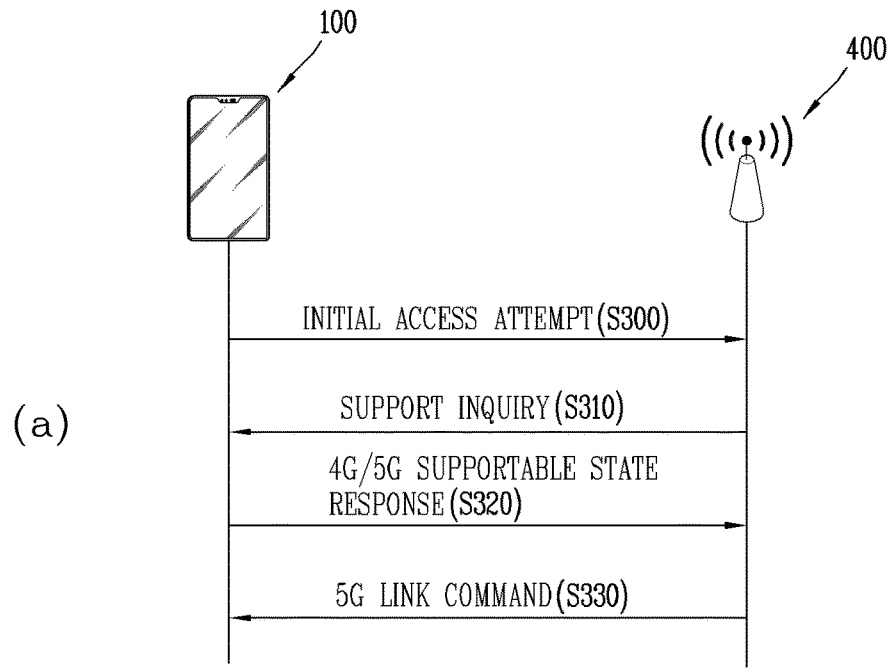
FIG. 4, including (a) and (b), shows flowcharts illustrating processes of exchanging messages with a base station upon establishing a 5G communication link, in an electronic device in accordance with an implementation of the present disclosure.
Figure 4:
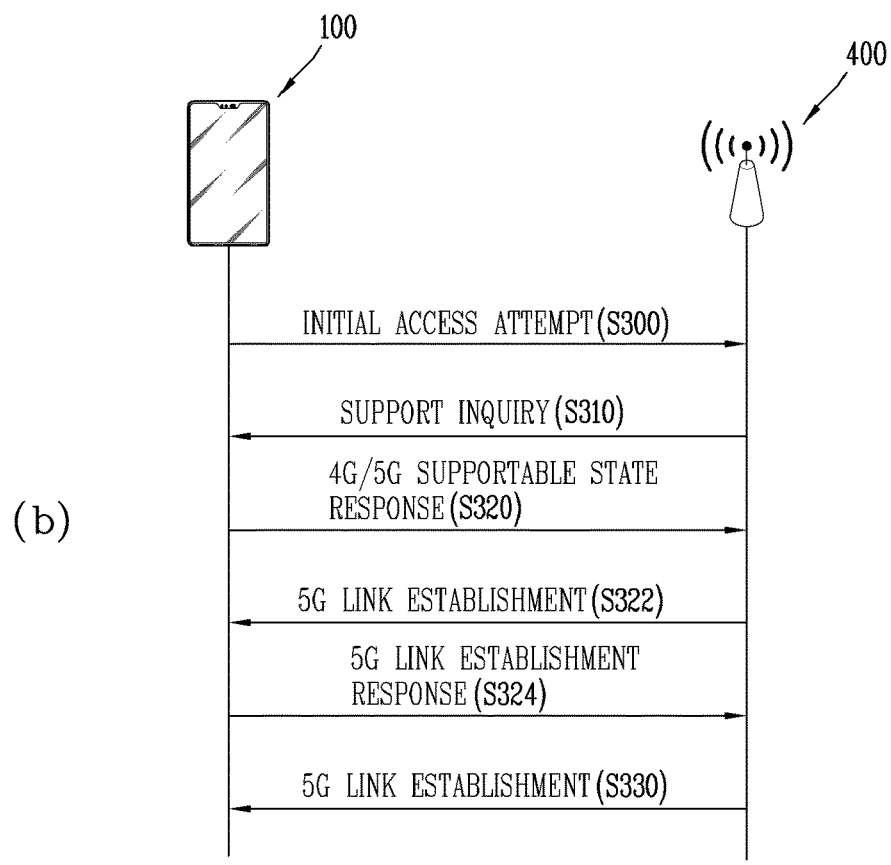

Referring to (a) of FIG. 4, the modem 270 of the electronic device 100 according to an implementation of the present disclosure may transmit a message for an initial access attempt to a base station 400 when a preset communication session condition is satisfied (S300). Here, the base station 400 may be a 4G base station connected to the electronic device 100 first. Alternatively, the base station 400 may be a base station which is capable of providing both 4G communication service and 5G communication service. Meanwhile, the communication session condition may be variously set.

For example, the communication session condition may be satisfied when the electronic device 100 which is currently accessing 5G communication (i.e., has established a 5G communication link) is handed over from a first base station to a second base station. In addition, the communication session condition may be satisfied when the electronic device 100 which has established the 5G communication link requests for data communication. When the 5G communication link is established, high-speed data transmission is allowed but high heat generation and power consumption are caused in a 5G communication module. Therefore, when data communication is not carried out, the 5G communication link may be terminated (or released). And when the data communication request is received, the 5G communication link may be established again through the communication session so that data can be transmitted according to a 5G communication method.

On the other hand, when the initial access attempt message (S300) is transmitted from the electronic device 100, the base station 400 may transmit a support inquiry message inquiring whether the electronic device 100 can support or perform 5G communication (S310). Then, the modem 270 of the electronic device 100 may measure signals received from 5G base stations around the electronic device 100, in response to the support inquiry message, and may search for a connectable 5G base station according to the measured signals.

The electronic device 100 may transmit to the base station 400 a response message indicating that 4G communication and/or 5G communication link can be established (supported) (S320). Here, the response message may include a result of the search for the connectable 5G base station around the electronic device 100. When it is determined based on the response message that the electronic device 100 can establish the 5G communication link, that is, when the electronic device 100 supports the 5G communication and a connectable 5G base station has been searched around the electronic device 100, the base station 400 may transmit a 5G link command to the electronic device 100 such that the 5G communication link with the searched 5G base station can be established (S330). Then, the modem 270 of the electronic device 100 may be wirelessly linked with the 5G base station according to a 5G communication method based on the received 5G link command, so as to transmit data to the 5G base station or receive data from the 5G base station according to the 5G communication method.

Meanwhile, as described above, the base station 400 may be a base station which can support both 4G communication and 5G communication. In this case, the electronic device 100 may establish the 5G communication link with the base station 400 according to the 5G link command. In (a) of FIG. 4 and the following description, description will be given under assumption that the electronic device 100 establishes a 5G wireless communication link with the base station 400 as the base station 400 can support both the 4G and 5G communications.

Meanwhile, depending on a communication provider that provides a 5G communication service, a message including information related to 5G link establishment (or setting) may be further received from the base station 400 to the electronic device 100. In response to the message, when the modem 270 of the electronic device 100 transmits a response message indicating the reception of the 5G link establishment information to the base station 400, the base station 400 may transmit a 5G link command to the electronic device 100. (b) of FIG. 4 illustrates an example of such a case.

In this case, as illustrated in (b) of FIG. 4, when a response message indicating that 4G communication method and/or 5G communication method is supportable is transmitted from the electronic device 100 to the base station 400 (S320), a message including 5G link establishment information may be transmitted from the base station 400 (S322). Then, a response message with respect to the message including the 5G link establishment information may be transmitted from the electronic device 100 to the base station 400 (S324). Responsively, the base station 400 may transmit the 5G link command to the electronic device 100 in step S330, and the electronic device 100 may establish the 5G communication link with the base station 400 according to the received 5G link command.

Meanwhile, as described above, when the electronic device 100 receives the 5G link command, the electronic device 100 may determine whether the 5G communication can be established, namely, whether it is restricted from establishing the 5G communication link. According to a result of the determination, the electronic device 100 may establish the 5G communication link or transmit a message indicating that the 5G communication link cannot be established to the base station 400. In addition, when the 5G communication link is restricted, the electronic device 100 may not perform a recovery process, and thus may not exchange messages with the base station 400 to establish the 5G communication link with the base station 400 until before a new communication session condition is satisfied.

To this end, the present disclosure may activate a function for restricting an establishment of a 5G communication link using a preset flag (hereinafter, referred to as a status flag) when the electronic device 100 is in a state in which the establishment of the 5G communication link is not allowable.

In more detail, when the electronic device 100 according to the present disclosure is in the state in which the 5G communication link cannot be established, a value of the status flag may be switched to an activated state and the 5G communication link establishment may be attempted again through the recovery process. When the number of re-attempts to establish the 5G communication link is greater than or equal to a preset number of times, the 5G communication link establishment may be restricted although a 5G link command has been received from the base station 400. Accordingly, an exchange of messages for establishing the 5G communication link between the electronic device 100 and the base station 400 can be prevented while the electronic device 100 is driven in the state in which the 5G communication link establishment is restricted.

Figure 5:
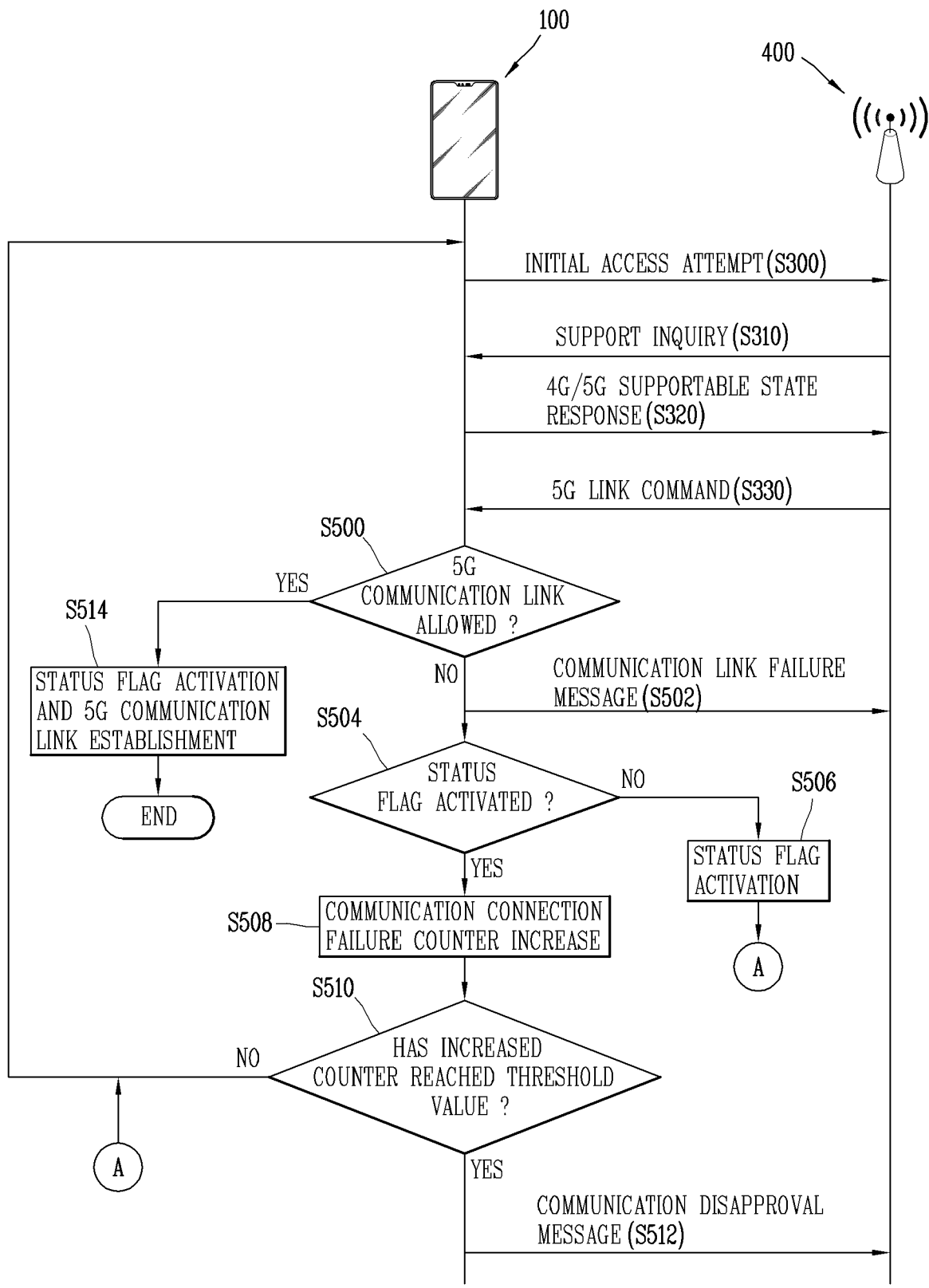
FIG. 5 is a flowchart illustrating operations of an electronic device according to an implementation of the present disclosure in more detail upon establishing a 5G communication link.

FIG. 5 is a flowchart illustrating operations of an electronic device according to an implementation of the present disclosure in more detail upon establishing a 5G communication link.

Referring to FIG. 5, the modem 270 of the electronic device 100 according to the implementation of the present disclosure may exchange those messages including information necessary to establish the 5G communication link with the base station 400 through those processes from step S300 to S330 as illustrated in (a) and (b) of FIG. 4. When the 5G link command is received in step S330, the modem 270 may determine whether the electronic device 100 is currently in a state to establish the 5G communication link (S500).

For example, the step S500 may be a step of determining whether a temperature of the first communication module 350, which is the 5G wireless communication module, corresponds to a preset temperature. If the temperature of the first communication module 350 is higher than or equal to the preset temperature, the modem 270 may determine that the electronic device 100 is currently restricted from establishing the 5G communication link. That is, the modem 270 may determine that the electronic device 100 is currently difficult to establish the 5G communication link.

Alternatively, the step S500 may be a step of determining whether a current supplied to the first communication module 350 is greater than or equal to a preset threshold value. In this case, the modem 270 may determine that the electronic device 100 is currently in a difficult state to establish the 5G communication link according to whether a current supplied to the first communication module 350 is less than the preset threshold value in step S500.

That is, when the current supplied to the first communication module 350 is greater than or equal to the preset threshold value, the modem 270 may determine that the electronic device 100 is currently in a state to establish the 5G communication link. On the other hand, when the current supplied to the first communication module 350 is less than the preset threshold value due to the shortage of remaining power of the battery (i.e., due to a low battery level), the modem 270 may determine that the electronic device 100 is currently in a state of being restricted from establishing the 5G communication link, namely, in a state in which it cannot establish the 5G communication link.

In addition, the step S500 may be a step of determining whether or not the 5G communication link can be established according to an operation state of the first communication module 350. For example, when the first communication module 350 is driven in a specific operation mode (for example, a low power mode), the modem 270 may determine that the electronic device 100 is currently difficult to establish the 5G communication link. Alternatively, when a failure is detected during an operation of the first communication module 350, the modem 270 may determine that the electronic device 100 is currently difficult to establish the 5G communication link.

When it is determined in step S500 that the electronic device 100 can currently establish the 5G communication link (i.e., is not restricted from establishing the 5G communication link), the modem 270 may establish the 5G communication link according to the 5G link command received in step S330. When it is checked that the status flag is in an inactive state, the status flag may be maintained in the inactive state. On the other hand, when the status flag is in an active state, the status flag may be switched to the inactive state.

On the other hand, when it is determined in step S500 that the electronic device 100 cannot currently establish the 5G communication link, the modem 270 may transmit a 5G communication link failure message (e.g., Secondary Cell Group (SCG) failure message) to the base station 400. The modem 270 may determine whether the status flag for controlling the exchange of the 5G communication link messages is in an active state (S504).

The status flag may be maintained in an inactive state when the electronic device 100 is normally driven, that is, when the electronic device 100 is restricted from establishing the 5G communication link. However, when it is determined in step S500 that the electronic device 100 cannot currently establish to the 5G communication link, the modem 270 may switch the inactive status flag into the active state (S506).

In addition, the procedure may go back to step S300 through a recovery process. Then, the step S300 of transmitting the access attempt message for establishing the 5G communication link to the base station 400 may be performed again, and then those steps S302 to S330 may be performed again. When the 5G link command is received from the base station 400 in step S330, the procedure may go to S500 to determine whether the electronic device 100 is in the state where it can establish the 5G communication link.

Meanwhile, when the status flag is in the active state in step S504, the modem 270 may increase a value of a communication link failure counter (S508). In this case, the value of the communication link failure counter may mean the number of re-attempts for establishing the 5G communication link through the recovery process.

On the other hand, when the value of the communication link failure counter is increased in step S508, the modem 270 may determine whether the increased communication link failure counter value has reached a preset threshold value (S510). When it is determined in step S510 that the increased value of the communication link failure counter is less than the preset threshold value, the procedure may go back to S300 through the recovery process.

In this case, the recovery process may include a process of releasing a 4G communication link currently established with the base station 400. When the established 4G communication link is released through the recovery process, the modem 270 may go back to step S300 to perform the processes of FIG. 5 again from the beginning.

Then, the step S300 of transmitting the access attempt message for establishing the 5G communication link to the base station 400 may be performed again, and subsequently those steps S302 to S330 may be performed again. When the 5G link command is received from the base station 400 in step S330, the procedure may go to S500 to determine whether the electronic device 100 can currently establish the 5G communication link.

On the other hand, when it is determined in step S510 that the communication link failure counter value increased in step S508 has reached the preset threshold value, the modem 270 may not perform the process of recovering the 5G communication link. Hereinafter, for convenience, an operation mode in which the 5G communication link is not recovered will be referred to as a 5G link limit mode.

When the electronic device 100 is driven in the 5G link limit mode, the modem 270 may not repeatedly perform the step S300. Therefore, those steps S302 to S330 may not be performed as well. That is, as the initial access attempt message is not retransmitted in step S300, the exchange of the messages for establishing the 5G communication link may no longer be performed between the base station 400 and the electronic device 100.

Meanwhile, when the electronic device 100 is driven in the 5G link limit mode, the modem 270 may ignore the 5G link command received from the base station 400. That is, when it is determined in step S510 that the communication link failure counter value has reached the preset threshold value, the modem 270 may not establish the 5G communication link according to the 5G link command received from the base station 400 before a new 5G communication link session is started. Accordingly, even when the 5G link command is transmitted from the base station 400 or another base station (e.g., a neighboring base station when a handover occurs), the 5G communication link may be restricted unless a new 5G communication link session condition is satisfied. As such, when the 5G communication link is restricted, the electronic device 100 may perform wireless communication with the base station according to a 4G communication method.

Meanwhile, when driven in the 5G link limit mode, the modem 270 may transmit a message (5G communication disapproval message) to inform the base station 400 that the electronic device 100 is currently driven in the 5G link limit mode (S512). In this case, the base station 400 which has received the 5G communication disapproval message may determine that the electronic device 100 is in a state in which it cannot perform 5G communication. This may result in preventing the base station 400 from transmitting a message for establishing the 5G communication link to the electronic device 100.

Meanwhile, when a communication session condition is satisfied again, the processes described with reference to FIG. 5 may be performed again. In this case, the status flag and the value of the communication link failure counter may be initialized. According to the determination result of step S500 which has been performed again, the 5G communication link may be established or the status flag may be deactivated and the value of the communication link failure counter may be increased.

Therefore, even if the electronic device 100 is driven in the 5G link limit mode of restricting the 5G communication link in a previous communication session, the electronic device 100 may establish the 5G communication link according to the determination result of the re-performed step S500 when a 5G communication link session is newly started as a new communication session is satisfied. Alternatively, the messages for establishing the 5G communication link may be exchanged between the base station 400 and the electronic device 100 until before the establishment of the 5G communication link fails by a preset number of times.

As described above, in the case where the electronic device 100 has received the 5G link command, the electronic device 100 may establish the 5G communication link with the base station when it can perform or support the 5G communication, while repeatedly attempting to establish the 5G communication link by the preset number of times. Also, when the establishment of the 5G communication link is failed even by the repeated attempts the preset number of times, the 5G communication link recovery may be interrupted, thereby preventing the unnecessary message exchange between the base station and the electronic device while the electronic device is restricted from establishing the 5G communication link.

As such, although such unnecessary message exchange between the base station and the electronic device can be prevented by the control of the electronic device. On the other hand, the unnecessary message exchange between the base station and the electronic device may alternatively be prevented by omitting the process that the base station transmits the message for establishing the 5G communication link according to the state of the electronic device.

As an example, when the establishment of the 5G communication link is failed (Radio Failure) due to the 5G link limit state as aforementioned, the modem 270 of the electronic device 100 may transmit a communication link failure message to the base station to inform the failure of the 5G communication link establishment (step S502 of FIG. 5). When the communication link failure message is transmitted from the electronic device 100, the base station may omit the transmission of the messages for establishing the 5G communication link and immediately retransmit the 5G link command. Then, the electronic device 100 may determine again whether it can establish the 5G communication link according to the re-received 5G link command. According to a result of the re-determination, the electronic device 100 may establish the 5G communication link (when the 5G communication can be established) or may retransmit the communication link failure message to the base station (when the 5G communication cannot be established). Accordingly, when the communication link failure message is received, the 5G link command can immediately be transmitted. This may result in omitting those message transmission processes, such as the initial access attempt message (S300 of (a) of FIG. 4), the 5G support inquiry message (S310 of (a) of FIG. 4), the 5G supportable state response message (S320 of (a) of FIG. 4), the 5G link establishment message and 5G link establishment response message (S322 and S324 of (b) of FIG. 4), and the like.

In addition, when the communication link failure message is transmitted the preset number of times or more, that is, when the communication link failure counter value has reached the preset threshold value, the 5G communication disapproval message indicating that the 5G communication link cannot be established may be transmitted to the base station.

Figure 6:
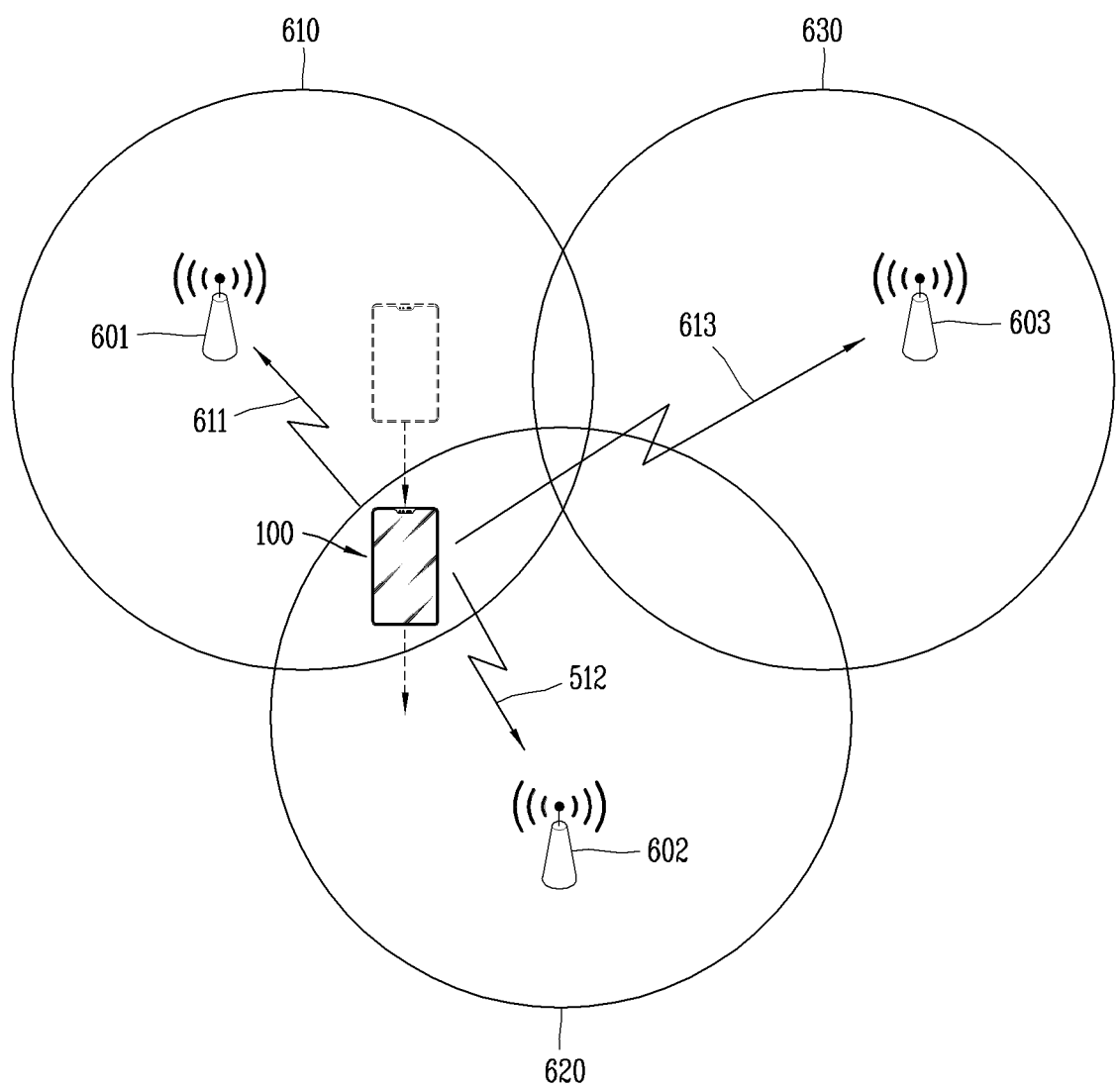
FIG. 6 is an exemplary diagram illustrating an example in which a 5G communication disapproval message is transmitted to a plurality of base stations from an electronic device during handover of the electronic device according to an implementation of the present disclosure.

On the other hand, such a configuration may be applied upon occurring handover of the electronic device. FIG. 6 is a diagram illustrating an implementation of the present disclosure in this case.

According to the aforementioned, even the case where handover occurs also corresponds to the communication session condition. That is, when handover occurs, the electronic device 100 may determine that the communication session condition has been satisfied, and may transmit the initial access attempt message to the base station. Responsively, messages for establishing the 5G communication link may be exchanged between the electronic device and the base station. When the 5G communication link can be established according to the state of the electronic device 100, the electronic device 100 may establish the 5G communication link with the base station according to the 5G link command received from the base station.

On the other hand, when the electronic device 100 is in the state where it cannot establish the 5G communication link, namely, in the state where the establishment of the 5G communication link is restricted, the electronic device 100 may transmit the communication link failure message (e.g., SCG Failure message) to the base station. In this case, the electronic device 100 may transmit the communication link failure message to at least one another base station as well as the base station to which the electronic device 100 is currently connected. In this case, the communication link failure message may be transmitted to other base stations around the electronic device.

Referring to FIG. 6, first, when a communication session condition is satisfied while the electronic device 100 according to an implementation of the present disclosure is located in a first cell 610, the electronic device 100 may exchange messages (e.g., messages in (a) and (b) of FIG. 4) with a first base station 601 of the first cell 610 through 5G communication. When a 5G communication link command is received, the electronic device 100 may establish the 5G communication link with the first base station 601 or transmit a communication link failure message to the first base station 601 depending on whether the electronic device 100 is in the state where it can establish the 5G communication link.

In this case, the communication link failure message may be transmitted to a plurality of base stations 601, 602, and 603 located around the electronic device 100. Accordingly, the first base station 601 to the third base station 603 may recognize that the electronic device 100 has failed to establish the 5G communication link.

In this state, when the electronic device 100 moves to an overlapping region between the first cell 610 and a second cell 620, the electronic device 100 may be handed over from the first base station 601 of the first cell 610 to the second base station 602 of the second cell 620.

In this case, as the handover occurs, the modem 270 of the electronic device 100 according to the implementation of the present disclosure may determine that a new communication session condition has been satisfied. Therefore, the electronic device 100 can transmit the initial access attempt message for establishing the 5G communication link to a new base station, namely, the second base station 602 to which the electronic device 100 is connected due to the handover.

Meanwhile, the second base station 602 may identify based on the previously-received communication link failure message that the electronic device 100 that transmitted the initial access attempt message is an electronic device that has failed to establish the 5G communication link with the first base station 601. The second base station 602 may then directly transmit the 5G link command to the electronic device 100, with omitting the transmission of the 5G communication support inquiry message (S310 of (a) of FIG. 4), the 5G supportable state response message (S320 of (a) of FIG. 4), the 5G link establishment message and 5G link establishment response message (S322 and S324 of (b) of FIG. 4), and the like. Then, the electronic device 100 may determine again whether it can establish the 5G communication link according to the re-received 5G link command. According to a result of the re-determination, the electronic device 100 may establish the 5G communication link (when the 5G communication link can be established) with the second base station 602 or may retransmit the communication link failure message to neighboring base stations including the second base station (when the 5G communication link cannot be established).

The foregoing description has been given of the configuration in which the communication link failure message is transmitted from the electronic device 100 to a plurality of base stations around the electronic device 100. Of course, the communication link failure message received from the electronic device 100 may alternatively be shared among base stations.

For example, similar to the example illustrated in FIG. 6, when the electronic device is handed over from the first cell 610 to the second cell 620, the first base station 601 may transmit the communication link failure message received from the electronic device 100 to the second base station 602. That is, when the handover of the electronic device 100 is performed, the communication link failure message received from the electronic device 100 may be shared among a plurality of base stations related to the handover. Accordingly, the second base station 602 may identify based on the communication link failure message transmitted from the first base station 601 that the electronic device 100 that has transmitted the initial access attempt message thereto due to the handover is the electronic device that has failed to establish the 5G communication link with the first base station 601. Accordingly, the second base station 602 may directly transmit the 5G link command in response to the initial access attempt message.

The foregoing description has been given of the example in which the communication link failure message is propagated from the electronic device 100 or the communication link failure message is shared among a plurality of related base stations (e.g., handover), but there may alternatively be other methods of sharing the communication link failure message.

For example, the communication link failure message may be transmitted to a base station located at a higher layer than the first base station 601 and the second base station 602. For example, if the first base station 601 and the second base station 602 are gNBs (g node B), the communication link failure message may be stored in a service-gate way (S-GW). In this case, the communication link failure message of the electronic device 100 may be shared among a plurality of gNBs connected to the S-GW.

According to at least one of implementations of the present disclosure, when an electronic device is in a state in which an establishment of a 5G communication link is restricted, unnecessary message exchange between a base station and the electronic device for establishing the 5G communication link can be prevented, which may result in reducing waste of radio resources and stabilizing a communication state of the electronic device.

In addition, according to at least one of implementations of the present disclosure, upon a handover of an electronic device, a state of the electronic device may be shared among base stations associated with the handover, thereby reducing unnecessary message exchange during the handover.

Meanwhile, in the above description of the present disclosure, specific embodiments have been described, but various modifications may be made without departing from the scope of the present disclosure. The present disclosure can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may also include the controller 180 of the electronic device 100. Therefore, the detailed description should not be limitedly construed in all of the aspects, and should be understood to be illustrative. Therefore, all changes and modifications that fall within the metes and bounds of the claims, or equivalents of such metes and bounds are therefore intended to be embraced by the appended claims.

What is claimed is:

1. An electronic device, comprising:
    a communication unit configured to perform wireless communication in at least one of a first communication method and a second communication method; and
    a modem configured to determine whether a communication link according to the first communication method is allowed to generate a determination result, and establish the communication link according to the first communication method according to the determination result, when a first communication link command is received from a base station that transmits, in response to a request of the electronic device, the first communication link command for the communication link according to the first communication method,
    wherein the base station repeatedly transmits the first communication link command to restore the first communication link, when the communication link according to the first communication method with the electronic device that has received the first communication link command fails, and
    wherein the modem is further configured to:
    restore repeatedly the first communication link according to the first communication link command being received a preset number of times: and
    transmit, to the base station, a message indicating that the first communication link is not possible so that the base station stops transmitting the first communication link command, if the communication link according to the first communication method is not established with the base station even after restoration of the first communication link is repeatedly attempted for the preset number of times.

2. The electronic device of claim 1, wherein the modem activates a preset status flag and increases a counter value indicating a number of failure to establish the communication link according to the first communication method, when the establishment of the communication link according to the first communication method is not allowed according to the result of the determination as to whether or not the establishment of the communication link according to the first communication method is allowed, and
    wherein the modem interrupts the recovery process until before a new communication. session condition is satisfied when the increased counter value has reached a preset threshold value.

3. The electronic device of claim 2, wherein the modem retransmits a request for establishing the communication link according to the first communication method to the base station through the recovery process and re-receives the first communication link command from the base station, in response to the re-transmitted request, when the increased counter value has not reached the preset threshold value.

4. The electronic device of claim 1, wherein the modem ignores the first communication link command upon receiving the first communication link command before a new communication session condition is satisfied when the recovery process is interrupted.

5. The electronic device of claim 4, wherein the modem determines that the new communication session condition has been satisfied when a new data communication is requested or the electronic device is handed over, and re-transmits a request for establishing the communication link according to the first communication method to the base station.

6. The electronic device of claim 1, wherein the communication unit comprises a first communication module configured to establish a wireless communication link according to the first communication method, and a second communication module configured to establish a wireless communication link according to the second communication method, and
    wherein the modem determines that the electronic device is in a non-allowed state to establish the communication link according to the first communication method when a temperature of the first communication module is a preset temperature or higher, or a battery level of the electronic device is a preset level or lower.

7. The electronic device of claim 1, wherein the first communication method is a Fifth-Generation (5G) communication method using a Sub-6 frequency band and the second communication method is a Fourth-Generation (4G) communication method.

8. The electronic device of claim 1, wherein the modem transmits the message indicating that the first communication link is not possible to at least one base station employing the first communication method among neighboring base stations of the electronic device.

9. The electronic device of claim 1, wherein the modem performs wireless communication with the base station according to the second communication method when the communication link according to the first communication method with the base station fails.

10. A method for controlling an electronic device that performs wireless communication with a base station that transmits a first communication link command for communication link according to the first communication method in response to a received link request, and repeatedly transmits the first communication link command to restore the first communication link when the communication link according to the first communication method with the electronic device that has received the first communication link command fails, the method comprising:
    a first step of determining whether a communication link according to the first communication method is possible when the first communication link command is received; and
    a second step of performing the communication link according to the first communication method according to a determination result of the first step, or a third step of performing wireless communication with the base station according to a second communication method different from the first communication method, wherein the third step further comprises:

a 3-1 step of activating a status flag when the communication link according to the first communication method fails according to the determination result of the first step;

a 3-2 step of retrying the communication link according to the first communication method according to the received first communication link command, when the retrying the communication link according to the first communication method fails again, a 3-3 step of increasing a counter value indicating a number of communication link failures according to the first communication method and a 3-4 step of performing wireless communication according to the second communication method when the retrying the communication link according to the first communication method fails, wherein the 3-3 step further comprises:

a step A of determining whether the counter value has reached a preset threshold value; and a step B of transmitting a message indicating that the first communication link is not possible to the base station so that the base station does not transmit the first communication link command when the counter value reaches the threshold value.

11. The method of claim 10, wherein the electronic device ignores the first communication link command upon receiving the first communication link command before a new communication session condition is satisfied when the increased counter value has reached the preset threshold value.

12. The method of claim 10, wherein a communication session condition for establishing the communication link according to the first communication method is satisfied when a new data communication is requested or the electronic device is handed over.

13. The method of claim 10, wherein the step B comprises a step C of transmitting, by the electronic device, a preset communication link failure message to at least one other base station employing the first communication method, among neighboring base stations of the electronic device, when the electronic device is not allowed to establish the communication link according to the first communication method.

* * * * *